(12) United States Patent
Nakajima et al.

(10) Patent No.: US 6,430,470 B1
(45) Date of Patent: Aug. 6, 2002

(54) CASH-LESS AUTOMATIC VENDING SYSTEM

(75) Inventors: Kazuya Nakajima; Yasunari Nakajima, both of Sawa-gun (JP)

(73) Assignee: Sanden Corporation (JP)

( * ) Notice: Subject to any disclaimer, the term of this patent is extended or adjusted under 35 U.S.C. 154(b) by 84 days.

(21) Appl. No.: 09/697,430

(22) Filed: Oct. 27, 2000

(30) Foreign Application Priority Data

Oct. 29, 1999 (JP) .......................................... 11-308906

(51) Int. Cl.[7] .............................................. G06F 17/00
(52) U.S. Cl. ...................... 700/237; 700/236; 700/241; 700/244
(58) Field of Search ................................ 700/231, 232, 700/237, 236, 241, 244; 235/381, 385; 705/17

(56) References Cited

U.S. PATENT DOCUMENTS 5,386,462 A * 1/1995 Schlamp .................... 379/106
5,936,221 A * 8/1999 Corder et al. ............... 235/380

OTHER PUBLICATIONS

BBC News, "Sci/Tech Dial C for coffee", Wednesday, Oct. 27, 1999, 2 pages.*

* cited by examiner

Primary Examiner—Christopher Ellis
Assistant Examiner—Khoi H. Tran
(74) Attorney, Agent, or Firm—Banner & Witcoff

(57) ABSTRACT

A customer operates his portable communication terminal to call a vending management center and to transmit a purchase request for buying an item from an intended one of a plurality of automatic vending machines. The vending management center transmits a selling allowance to the intended automatic vending machine. The automatic vending machine, in accordance with the selling allowance, delivers an item indicated by the customer. Thus the customer can obtain his desired item. The automatic vending machine, after delivering the item, transmits dispensing result data to the vending management center. Then, the vending management center prepares user and sales data from the dispensing result data and transmits the user and sales data to a proprietary of the communication network accommodating the portable communication terminal. Subsequently, the proprietary, in accordance with the user and sales data, settles an account with the customer on the communication fee and the item price.

7 Claims, 3 Drawing Sheets

CASH-LESS AUTOMATIC VENDING SYSTEM

BACKGROUND OF THE INVENTION

1. Field of the Invention

The present invention relates to a cash-less automatic vending system which allows specified customers or users to obtain or buy a desired item or items such as goods or service provided by automatic vending machines without using cash.

2. Description of the Related Art

Conventionally, if a person wants to buy something from an automatic vending machine, a trade transaction between the person and the automatic vending machine can be completed by inserting cash such as a bill or a coin into the machine or by inserting a pre-paid card which has a value corresponding to a certain amount of cash into the machine.

However, whenever a person wants to buy something from such an automatic vending machine, he or she always has to carry an amount of cash or a pre-paid card to the vending machine. As a result, the person will feel inconvenient. Moreover, if an amount of cash inserted into an automatic vending machine is larger than the price of a desired item, a customer often has to get a change from the automatic vending machine. At this time, if the automatic vending machine does not have sufficient cash corresponding to a sufficient amount of small changes, it will become impossible for the vending machine to complete its predetermined selling operation, hence bringing an inconvenience to customers. Alternatively, the vending machine may dispense the item but not return the proper change, if any, to the customer.

On the other hand, it is necessary for an automatic vending machine to be equipped with a cash identifying device for determining the value of the cash deposited and whether the cash deposited is true or not. Since the cash identifying device is manufactured at a high cost, the automatic vending machine is often expensive. In addition, during recent years, since the forgery of false bills and false coins has become more and more of a social problem, it has become necessary to frequently modify or repair these cash identifying devices in order to effectively deal with the increasing forgery. In addition, since an automatic vending machine is required to receive into it a certain amount of cash serving as an amount of small change, the machine itself must be theftproof. Moreover, the machine must be able to efficiently make and dispense change to a customer at the conclusion of a transaction. Hence, a considerable amount of labor is required in the daily maintenance of the automatic vending machine. Furthermore, if an automatic vending machine sells cigarettes and alcoholic drinks, the machine is required to have a function of restricting its selling operation at night so as not to easily sell cigarettes and alcoholic drinks to adolescents. For this reason, the chances of selling these items to adults will be undesirably decreased, hence undesirably reducing efficiency in the selling operation of the vending machine.

SUMMARY OF THE INVENTION

The present invention has been accomplished in order to solve the above problems, and it is an object of the invention to provide a cash-less automatic vending system which allows a customer to obtain his or her desired item without the necessity of using cash.

According to the present invention, a cash-less automatic vending system is obtained which is capable of settling accounts for items delivered to a customer by an automatic vending machine without using cash, a prepaid card, or a credit card. The cash-less automatic vending system comprises:

an automatic vending machine having items to be sold and delivering a requested one of the items in response to a selling allowance signal for the requested item, the automatic vending machine producing dispensing result data of the item delivered;

a communication terminal capable of inputting and transmitting a customer's ID code and a purchase request for requesting to buy items in the automatic vending machine;

a vending management center coupled to the communication terminal and the automatic vending machine, the vending management center defining the customer's ID code and the purchase request received from the communication terminal to transmit the selling allowance signal to the automatic vending machine, the vending management center producing user and sales data for the customer from the dispensing result data; and an account center coupled to the vending management center and preparing an account for the customer by using the user and sales data in the vending management center, to settle the account with the customer.

According to an embodiment of the cash-less automatic vending system, the vending management center has a user/machine data base memory storing data about users who are allowed to use the cash-less automatic vending system. The vending management center also includes a user specifying means capable of specifying a current customer who has input the purchase request. This is accomplished by comparing the customer's ID code input with the data in the user/machine data base memory to produce a user specifying signal when the current customer is one of the user registered in the user/machine data base. The vending management center further includes allowance determination means that responds to the user specifying signal in order to produce the selling allowance signal.

In another embodiment of the cash-less automatic vending system, the communication terminal is a portable communication terminal of the customer that is accommodated in a first communication network managed by a network management office. The customer's ID code is a telephone number allotted to the portable communication terminal. The vending management center has a first communication control circuit by which the vending management center is coupled with the portable communication terminal and the account center through the first communication network. The account center is the network management office. The account center produces the account including a network using fee together with a sales account according to the user and sales data for the customer.

According to an embodiment, the cash-less automatic vending system further comprises a plurality of automatic vending machines having individual machine ID codes allotted thereto, respectively. Each of the automatic vending machines has a display for displaying its own machine ID code. While using the present invention, the current customer transmits, through his own portable communication terminal, the machine ID code of an intended one of automatic vending machines together with the purchase request to the vending management center. The vending management center has a machine data base storing data of automatic vending machines accommodated in the system, and a machine identifying means for identifying the intended machine by comparing the machine ID code input and the data in the machine data base memory to produce a machine specifying signal when the intended machine is one of the automatic vending machines registered in the machine data base memory. The selling allowance determination means produces the selling allowance signal based on reception of both of the user specifying signal and the machine specifying signal.

In the cash-less automatic vending system, upon receiving both of the user identifying signal and the machine identifying signal, the selling allowance determination means produces the selling allowance signal only when a predetermined condition is fulfilled.

In another embodiment of the cash-less automatic vending system, the vending management center has a second communication control means and each of the automatic vending machines has a communication control means. The vending management center and each of the automatic vending machines are coupled to each other by a second communication network through the second communication control means and the communication control means of each automatic vending machine.

In another embodiment, a communication interface is disposed between the portable communication terminal and the vending management center. The portable communication terminal communicates with the communication interface, and the communication interface means transmits to the vending management center the purchase request information obtained through the communication with the portable communication terminal.

The automatic vending machine involved in the present invention, may be a vending machine for selling cans of juice and cans of beer, a vending machine capable of introducing a drink such as juice into a paper cup and then selling it, a vending machine for selling cigarettes, a vending machine for use in a restaurant or a railway station for selling tickets. In other words, the automatic vending machine involved in the present invention, includes those which can sell various items and are capable of settling accounts with customers based on the prices of the items. Furthermore, such an automatic vending machine also includes a machine capable of settling accounts with users on the price of a service such as in a parking place.

DESCRIPTION OF THE PREFERRED EMBODIMENTS

Figure 1:
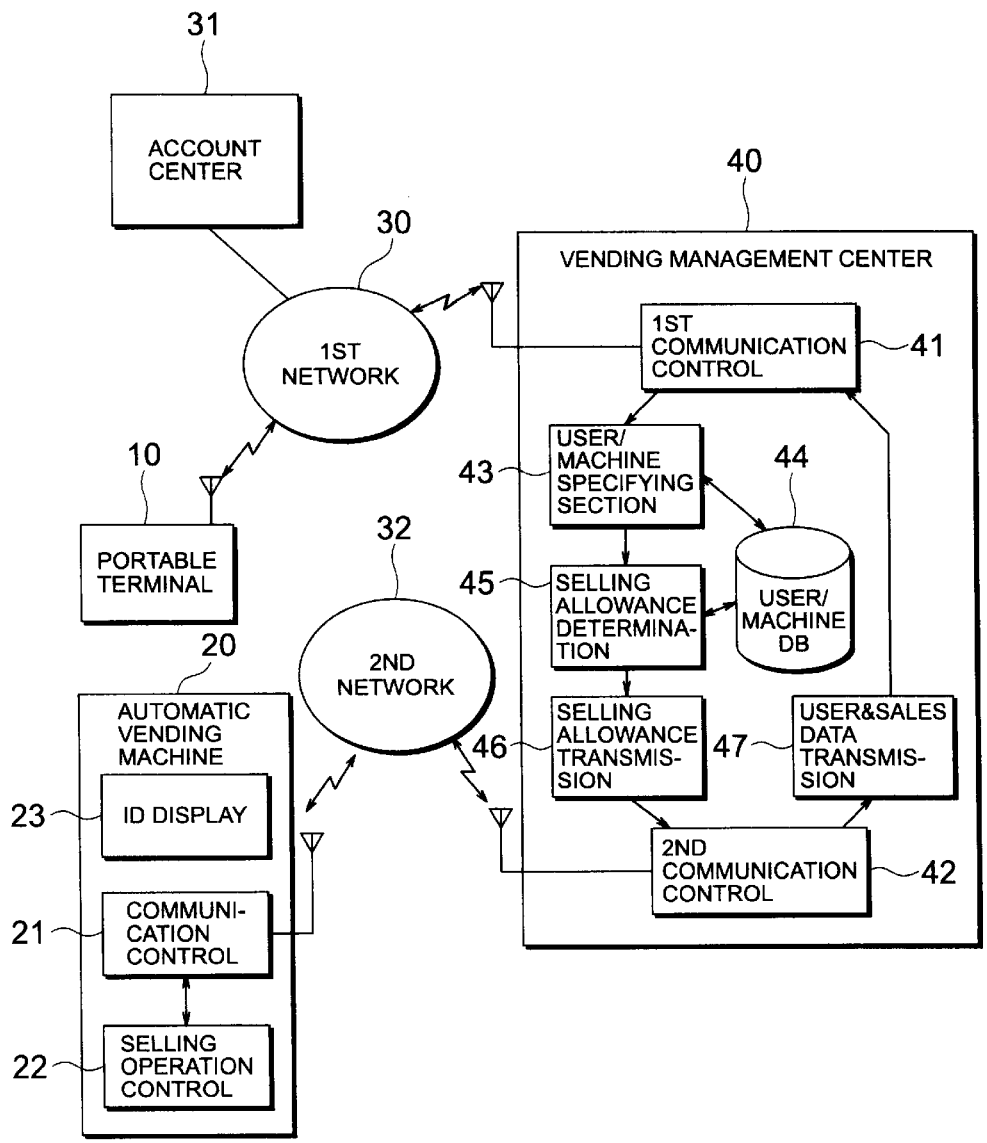
FIG. 1 is a block diagram showing a cash-less automatic vending system according to one embodiment of the present invention.

A cash-less automatic vending system according to one embodiment of the present invention will be described in the following with reference to FIG. 1. FIG. 1 is a block diagram showing the cash-less automatic vending system.

As shown in FIG. 1, the cash-less automatic vending system according to an embodiment of the present invention is so formed that a customer (not shown) is allowed by using his portable communication terminal 10 to obtain a desired item from an intended one of a plurality of automatic vending machines 20 (one is shown) without using cash. Specifically, the customer transmits to a vending management center 40 his ID code and a machine ID code of the intended automatic vending machine together with a purchase request for buying an item from the intended automatic vending machine. When the telephone number of the portable communication terminal 10 is used as the customer's ID code, it is unnecessary for the user to separately input and then transmit his ID code.

The portable communication terminal 10 is accommodated in a first communication network 30. Such a portable communication terminal 10 may be either a radio communication terminal or a wire communication terminal. However, in order to ensure a convenience for a customer, it is preferred that the portable communication terminal 10 include a radio communication terminal. For example, it is preferred to use a wireless telephone. In particular, it is preferred to use a PDC terminal, a CDMA terminal, a W-CDMA terminal or a PHS terminal. In the present embodiment, a PDC terminal is used. Therefore, the first communication network 30 is a PDC communication network. Furthermore, such a portable communication terminal 10 can also be used to transmit data signals. As a data communication method, it is possible for the data to be transmitted by a push-tone signal.

A proprietary or a network management office of the first communication network 30 constantly monitors the network. This management office performs as an account center 31 by adding up the communication fees incurred by the user. A system has already been established which allows the user of the portable communication terminal 10 to settle an account with the proprietary of the first communication network on an amount of money representing communication fees incurred during the use of a first communication network 30.

The automatic vending machine 20 comprises a communication control section 21 for controlling a communication with a vending management center 40 through a second communication network 32. The automatic vending machine also includes a selling operation control section 22 for controlling the selling of various items, and a machine ID code display section 23 for displaying a machine ID code of the automatic vending machine 20. The machine ID code display section 23 is provided on the outside of the vending machine so as to be easily visible by a customer.

The communication control section 21 of the automatic vending machine 20 may be either a control section for use in a radio communication system or a control section for use in a wire communication system. If the communication system is a radio communication system, the installation of the automatic vending machine will be easy and relatively inexpensive. On the other hand, if the communication system is a wire control system, an installation cost for the communication system will be high. As a result, a selection may be made to employ either a radio communication control section or a wire communication control section, depending on a real need under a specific condition. In the present embodiment, the second communication network 32 is selected to be a PHS network, and the communication control section 21 is selected to be a device which can be received into the PHS communication network.

The selling operation control section 22 of the automatic vending machine 20 is interlocked with a coin identifying device (not shown) and an operating button (not shown) so as to control the selling of various items. In general, the selling operation control section 22 can perform its control in a manner such that whenever a predetermined amount of money is inserted into the vending machine a selling allowance signal for an item will be produced. Upon the selling allowance signal being produced, the automatic vending machine enters into its selling mode to dispense the item indicated by the operating button pushed so that a customer obtains the desired item that corresponds to the operating button which he or she has pushed. Furthermore, when the selling operation control section 22 has received a selling allowance signal from the vending management center 40 through the second communication network 32, the vending machine is still allowed to perform a selling operation even though the customer has not inserted any money. In this instance, the customer is allowed to obtain a desired item corresponding to an operating button which he or she has pushed, while at the same time the selling result is transmitted to the vending management center 40 through the second communication network 32.

Vending management center 40 includes a first communication control section 41 for controlling a communication with the portable communication terminal 10 through the first communication network 30, and a second communication control section 42 for controlling a communication with the automatic vending machine 20 through the second communication network 32.

Furthermore, the vending management center 40 has a user/machine specifying section 43 for specifying a customer who has sent a purchase request from the portable communication terminal 10. In more detail, there is established a user/machine data base memory 44 which has, in advance, stored names of users of this system and the user's ID code or telephone numbers of portable communication terminals 10 used by the users. The vending management center 40 employs the customer's telephone number obtained from the caller's number notifying service provided to both the portable communication terminal 10 and the first communication network 30 to specify (identify) the customer as one of the users of the system and produce a user specifying signal. This is accomplished when the telephone number of the portable communication terminal 10 of the customer is compared with the users' data in the user/machine data base memory 44. Also, the user/machine specifying section 43 compares the machine ID code transmitted from the portable communication terminal 10 with the machines' data in the user/machine data base memory 44 and specifies the intended machine to produce a machine specifying signal.

Moreover, the vending management center 40 has a selling allowance determining section 45 that receives the user specifying signal and the machine specifying signal. In response to these received signals, the selling allowance determining section 45 determines a selling allowance and produces a selling allowance signal.

Alternatively, the selling allowance determining section 45 determines whether or not a certain item is allowed to be sold by the automatic vending machine 20. In this way, it is possible to ensure a desired control in order that certain items such as alcoholic drinks will not be sold to adolescents. Specifically, a user's data such as age may be stored in the user/machine data memory 44 in advance. Further, each item sold by the automatic vending machine 20 is specified in accordance with the automatic vending machine's ID code transmitted from the customer. Then, it is determined whether an item is allowed to be sold, in accordance with the data of the automatic vending machine and the user's data in relation to the customer.

Furthermore, the vending management center 40 has a selling allowance transmitting section 46 which is so formed that when the selling allowance determining section 45 has determined the selling allowance, the selling allowance signal is transmitted to the intended automatic vending machine 20. At this time, the selling allowance signal is thus transmitted to the automatic vending machine, in accordance with the automatic vending machine's ID code which is transmitted from the customer using the portable communication terminal 10.

Moreover, the vending management center 40 has a user and sales data transmitting section 47 which is capable of producing user and sales data from dispensed result data transmitted from the automatic vending machine 20 through the second communication network 32. The user and sales data transmitting section 47 is also capable of transmitting the user and sales data to the account center 31 through the first communication network 30. In this connection, the user and sales data may also be transmitted to the account center 31 each time the dispensing result data is received from the automatic vending machine 20. Alternatively, the dispensing result data is first accumulated so as to be added up during a predetermined time period (for example, one month) and then transmitted as the user and sales data to the account center 31.

The account center 31, in accordance with the user and sales data received from the vending management center 40, makes an account for the customer or user and settles accounts with the customer on the communication fees for using the portable communication terminal 10 and on the price of items dispensed. Further, an equivalent corresponding to the price of the sold items, which has been recovered from the customer in accordance with the above settlement of accounts, is paid to the vending management center 40 so that all accounts are settled.

Figure 2:
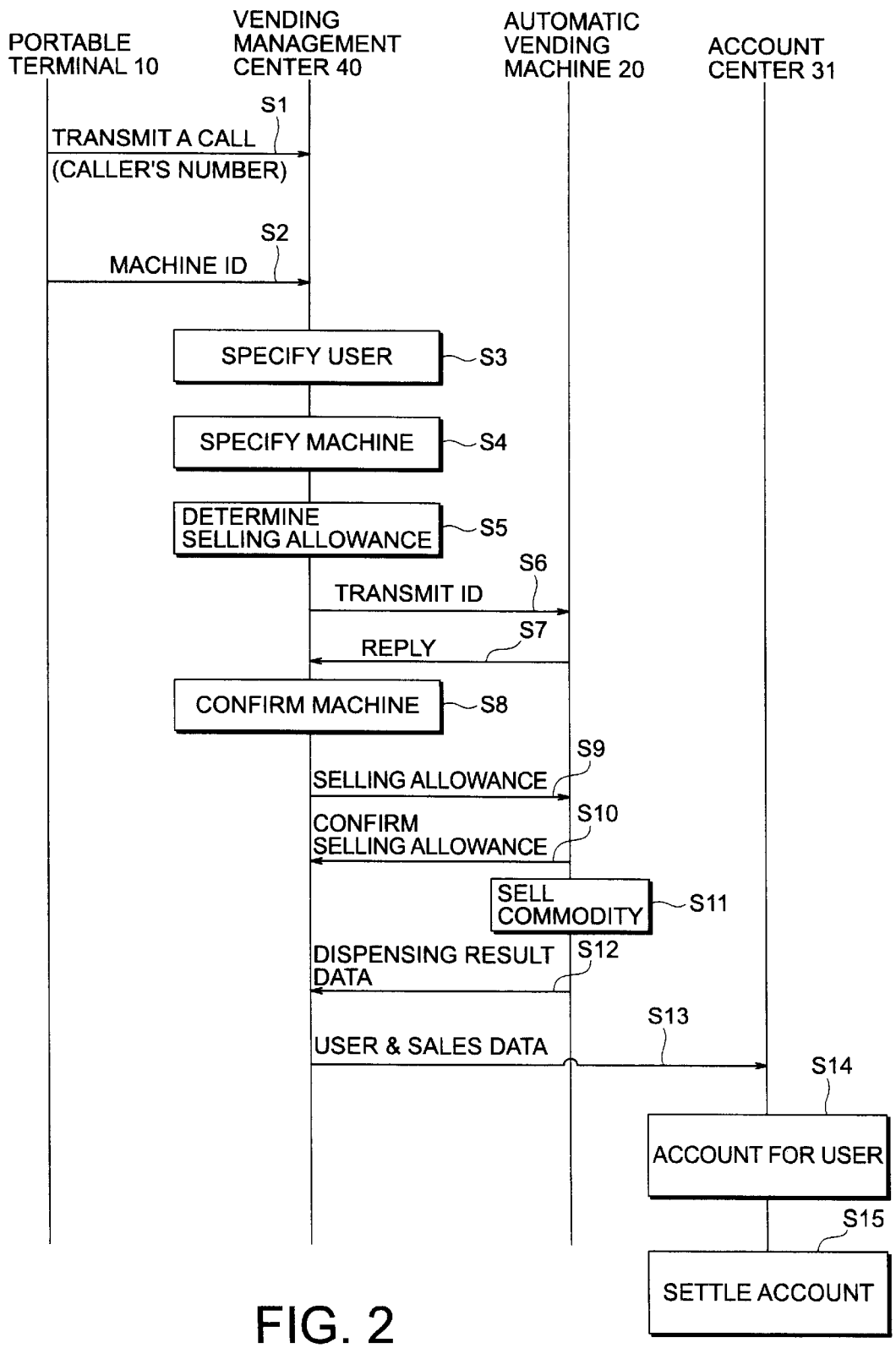
FIG. 2 is a sequence chart showing an operation of the cash-less automatic vending system.

In the following, a flow chart for buying an item in the cash-less automatic vending system will be described in detail with reference to FIG. 2. Here, FIG. 2 is a sequence chart for the cash-less automatic vending system of the present invention.

At first, a customer or a user uses the portable communication terminal 10 to send a call to the vending management center 40 (step S1). In this way, a connection is thus established between the portable communication terminal 10 and the vending management center 40. At this time, by virtue of a caller number notifying service of the first communication network 30, the number of the portable communication terminal 10 is then provided, as the customer's ID code, to the vending management center 40. Afterwards, the customer uses the portable communication terminal 10 to send a machine ID code (displayed on the display section 23) of the intended automatic vending machine 20 to the vending management center 40 (step S2).

The vending management center 40, upon establishing its connection with the portable communication terminal 10, specifies the customer in accordance with the caller's number and by using the user's data in the data base memory 44 (step S3). Then, the intended automatic vending machine 20 is specified in accordance with the machine ID code of this automatic vending machine 20 with reference to the user/machine data base memory 44(step S4). In one aspect, with reference to the user/machine data base memory 44, it is then determined whether selling an item to the specified customer by the intended automatic vending machine is allowed (step S5).

Then, the vending management center 40 transmits the machine ID code to the intended automatic vending machine 20 in order to confirm whether or not the automatic vending machine 20 is truly existing (step S6). The automatic vending machine 20, upon receiving the confirmation signal, sends a reply to the vending management center 40 (step 7). The vending management center 40, in accordance with the reply, can confirm the presence of the automatic vending machine 20 (step S8).

Subsequently, the vending management center 40 transmits a selling allowance signal to the automatic vending machine 20 (step S9). The automatic vending machine 20, upon receiving the selling allowance signal, transmits a confirmation signal to the vending management center 40 (step S10). Afterwards, the automatic vending machine 20 executes the selling operation (step S11). Specifically, the vending machine is at first put into its selling condition as if just cash had been inserted into the machine. Then, the automatic vending machine dispenses an item in accordance with the choice made by the customer. Once such a selling operation is finished, the automatic vending machine 20 transmits dispensing result data (such as the sort and the number of the items which have been sold in the above process) to the vending management center 40 (step S12).

The vending management center 40, upon receiving the dispensing result data, produces the user and sales data. In accordance with a certain necessity, the vending management center 40 renews the related data of the user/machine data base memory 44, and transmits the user and sales data to the account center 31 of the first communication network 30 (step S31). Here, the user and sales data transmitted from the vending management center 40 to the account center 31, may be processed (if necessary) in accordance with certain needs. Further, the vending management center 40 is allowed to either transmit the user and sales data after each selling operation, or accumulate a certain amount of user and sales data during a certain time period and then transmit the accumulated data.

The account center 31 of the first communication network 30, upon receiving the user and sales data, prepares an account for the user (step 14) and performs a settlement of the account in a predetermined manner (step S14). Here, the above settlement between the customer and the account center 31 may be carried out at the same time as another account is settled on the communication fees incurred while using the portable communication terminal 10.

Through the above steps, if the customer has a portable communication terminal 10 such as a portable telephone or a PHS which are all now spreading rapidly, it will be easy for him or her to obtain a desired item or a desired service from the automatic vending machine 20 without needing to use cash or a pre-paid card. Further, since it is possible to avoid a problem that may occur when the machine does not have enough change, such as the termination of a sale, a customer can easily and exactly obtain his or her desired item by using the present invention. Therefore, the cash-less automatic vending system brings about a considerably increased convenience to customers.

Furthermore, with the use of the cash-less automatic vending system, it is possible to reduce an amount of cash to be accumulated within the automatic vending machine 20. Therefore, it is possible to reduce an amount of management work for recovering cash from automatic vending machines, and at the same time to reduce the possibility of cash theft. Further, since it is possible for the vending management center 40 to manage users, it is able to establish a vending restriction for users. In addition, it is possible to effectively use the data of the user's data base memory 44 accumulated in the vending management center 40 for further and other marketing purposes.

Figure 3:
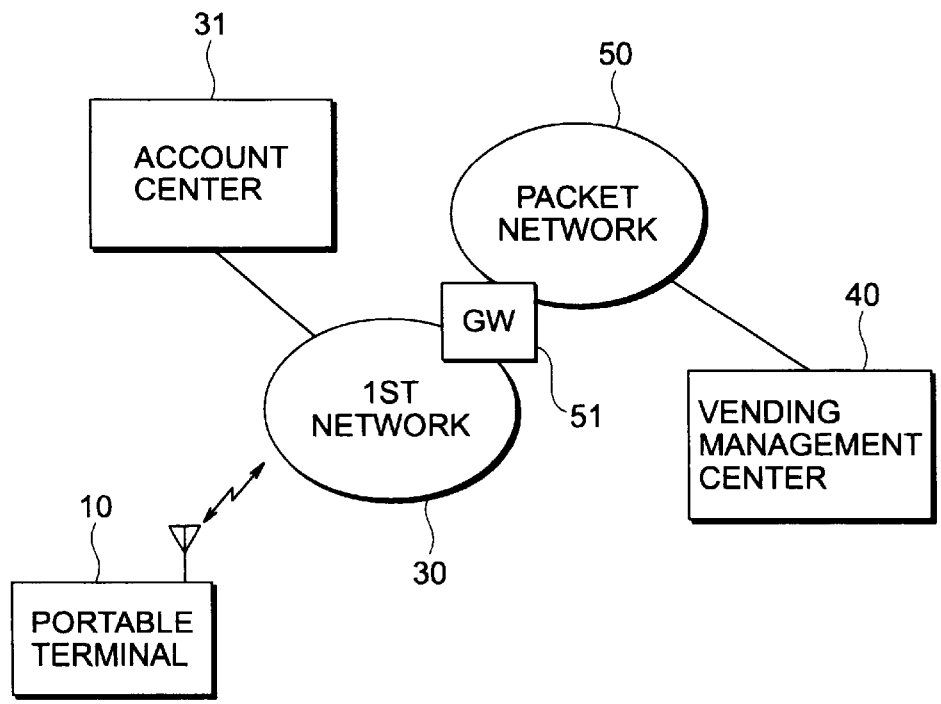
FIG. 3 is a block diagram showing a cash-less automatic vending system according to another embodiment of the present invention.

In the present embodiment, although a PDC circuit network has been used as the first communication network 30 for connecting the portable communication terminal 10 with the vending management center 40, the present invention should not be limited to such a specific arrangement. What is necessary is only to establish the connection between the portable communication terminal and the vending management center. For example, it is possible to use other communication networks such as the PHS circuit network described above. In addition, it is also possible that the portable communication terminal 10 and the vending management center 40 may be connected with each other through a plurality of communication networks. For example, as shown in FIG. 3, a PHS circuit network can be used as the first communication network 30 and connected with the portable communication terminal 10, while the vending management center 40 is connected, by means of ISDN circuit or a leased circuit, with a packet communication network 50 such as an inter-net. In the use of such an arrangement, if the first communication network 30 has a gate way 51 towards the packet communication network 50, it is possible to establish a communication between the portable communication terminal 10 and the vending management center 40. The automatic vending machine 20 is not shown in FIG. 3.

Furthermore, although in the present embodiment a PHS circuit network has been used as the second communication network for connecting the vending management center 40 with the automatic vending machine 20, the present invention should not be limited to such a specific arrangement. Namely, What is necessary is only to establish the connection between the vending management center and the automatic vending machine. For example, it is possible to use other communication networks such as a PDC circuit network, a general public circuit and a leased circuit. Further, as with the connection between the portable communication terminal 10 and the vending management center 40, it is also possible that the vending management center 40 and the automatic vending machine 20 may be connected with each other through a plurality of communication networks.

Figure 4:
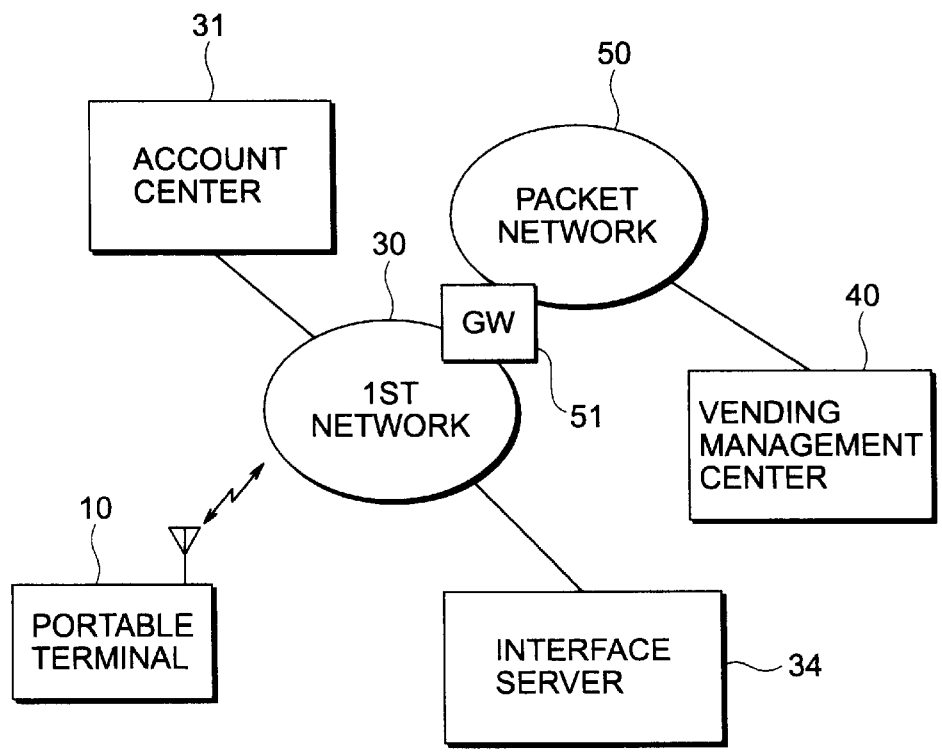
FIG. 4 is a block diagram showing a cash-less automatic vending system according to a further embodiment of the present invention.

Furthermore, although in the present embodiment the portable communication terminal 10 is connected with the vending management center 40 through the first communication network 30, the present invention should not be limited to such a specific arrangement. For example, as shown in FIG. 4, an interface server 34 may form part of the first communication network 30, and the portable communication terminal 10 may be connected with the interface server 34. The interface server 34, when connected with portable communication terminal 10, can be used to provide an interface to a customer. For example, it is possible to display on the portable communication terminal 10 an item menu indicating the list of items stored in the automatic vending machine, while simultaneously transmitting some information data input from the portable communication terminal 10 to the vending management center 40. With the use of such an arrangement, it is possible to provide a highly convenient cash-less automatic vending system. However, the above interface server should not be limited to the above-described arrangement in which it is connected to the first communication network 30. In fact, the interface server can also be set in the vending management center or other communication network. The automatic vending machine 20 is not shown in FIG. 4.

Furthermore, according to the present embodiment, a communication is conducted between the portable communication terminal 10 and the vending management center 40 through the first communication network, and another communication is carried out between the vending management center 40 and the automatic vending machine 20 through the second communication network. However, the present invention should not be limited to such a specific arrangement. That is, all the communication may be effected by way of an identical communication network.

In the present embodiment, the vending management center 40 has a means for specifying (identifying) the automatic vending machine 20 by comparing the machine ID code input and the data in the machine data base memory. The automatic vending machine 20 includes a display section for displaying a machine ID code. Meanwhile, the present invention has employed a method for transmitting the machine ID code from the portable communication terminal 10. However, the present invention should not be limited to such a specific arrangement. For example, the automatic vending machine 20 is allowed to have a display section for displaying a number (telephone number) for calling the vending management center 40, thereby making it possible to make a call to this number from the portable communication terminal 10. Here, the telephone number displayed on the display sections of different automatic vending machines are set to be different from one another. With the use of this, the vending management center 40 can specify each automatic vending machine by searching the number which the center 40 has received from outside.

The automatic vending machine involved in the present invention, as related in the above, may be an automatic vending machine for selling cans of juice and cans of beer, an automatic vending machine capable of selling drink such as juice loaded into a paper cup, an automatic vending machine for selling cigarettes, or an automatic vending machine for use in a restaurant or a railway station for selling tickets. In other words, the automatic vending machine involved in the present invention includes those which can sell various items and are capable of settling accounts with customers based on the prices of the items. Furthermore, such an automatic vending machine also includes one capable of settling accounts with customers on the price of a service such as in a parking place.

As described above, with the use of the present invention, when a customer operates his portable communication terminal to call a vending management center and to transmit a purchase request for buying an item from an intended one of a plurality of automatic vending machines, the vending management center transmits a selling allowance to the intended automatic vending machine. The automatic vending machine, in accordance with the selling allowance, delivers an item indicated by the customer. Thus the customer can obtain his or her desired item. The automatic vending machine, after delivering the item, transmits dispensing result data to the vending management center. Then, the vending management center prepares user and sales data from the dispensing result data and transmits the user and sales data to a proprietary of the communication network accommodating the portable communication terminal. Subsequently, the proprietary, in accordance with the user and sales data, settles an account with the customer on the communication fee and the item price. Therefore, the customer is allowed to obtain his or her desired item from the automatic vending machine without using cash.

In this way, according to the present invention, if a customer has a portable communication terminal such as a portable telephone or a PHS, which is now spreading rapidly, it will be easy for him or her to obtain a desired item from the automatic vending machine without using cash or a pre-paid card. Further, since it is possible to avoid a problem that may occur when the machine does not have enough change, such as the termination of a sale, the customer can easily and exactly obtain his or her desired item by using the present invention. Therefore, the cash-less automatic vending system brings about an increased convenience to customers.

Furthermore, with the use of the cash-less automatic vending system, it is allowed to reduce an amount of cash to be accumulated within the automatic vending machine. Therefore, it is possible to reduce an amount of management work for recovering cash from automatic vending machines, and at the same time to reduce the possibility of cash theft. Further, since it is possible for a vending management center to manage users of the system, it is able to establish a vending limitation for customers, when it is required.

What is claimed is:

1. A cash-less automatic vending system capable of settling accounts for items delivered to a customer by an automatic vending machine without using a cash, a prepaid card, and a credit card, which comprises:

an automatic vending machine having items to be sold and delivering a requested one of the items in response to a selling allowance signal for the requested item, said automatic vending machine producing dispensing result data of the item delivered;

a communication terminal capable of inputting and transmitting a customer's ID code and a purchase request for requesting to buy items in said automatic vending machine;

a vending management center coupled to said communication terminal and said automatic vending machine, said vending management center defining said customer's ID code and said purchase request received from said communication terminal to transmit said selling allowance signal to said automatic vending machine, said vending management center producing user and sales data for the customer from said dispensing result data;

an account center coupled to said vending management center and preparing an account for the customer by using said user and sales data in said vending management center, to settle the account with said customer.

2. A cash-less automatic vending system according to claim 1, wherein said vending management center has a user/machine data base memory storing data about users who are allowed to use the cash-less automatic vending system, user specifying means capable of specifying a current customer who has input said purchase request from comparison of said customer's ID code input with said data in said user/machine data base memory to produce a user specifying signal when the current customer is one of the users registered in the user/machine data base, and allowance determination means responsive to said user specifying signal to produce said selling allowance signal.

3. A cash-less automatic vending system according to claim 2, wherein said communication terminal is a portable communication terminal of the customer accommodated in a first communication network managed by a network management office, said customer's ID code is a telephone number allotted to said portable communication terminal, said vending management center has a first communication control circuit by which said vending management center is coupled with said portable communication terminal and said account center through said first communication network, and said account center is said network management office, said account center producing said account including a network using fee together with a sales account according to said user and sales data for the customer.

4. A cash-less automatic vending system according to claim 3, further comprising a plurality of automatic vending machines having machine ID codes allotted thereto, respectively wherein: each of said automatic vending machines has a display for displaying its own machine ID code, and the current customer transmits through his own portable communication terminal the machine ID code of an intended one of automatic vending machines together with said purchase request to said vending management center; and wherein said vending management center has a machine data base storing data of automatic vending machines accommodated in the system, and a machine identifying means for identifying the intended machine by comparing the machine ID code input and the data in said machine data base memory to produce a machine specifying signal when the intended machine is one of the automatic vending machines registered in the machine data base memory, said selling allowance determination means produces said selling allowance signal based on reception of both of said user specifying signal and said machine specifying signal.

5. A cash-less automatic vending system according to claim 4, wherein upon receiving both of said user identifying signal and said machine identifying signal, said selling allowance determination means produces said selling allowance signal only when a predetermined condition is fulfilled.

6. A cash-less automatic vending system according to claim 4, wherein said vending management center has a second communication control means and each of said automatic vending machines having a communication control means, said vending management center and each of said automatic vending machines are coupled to each other by a second communication network through said second communication control means and said communication control means.

7. A cash-less automatic vending system according to claim 3, wherein a communication interface is disposed between said portable communication terminal and said vending management center, said portable communication terminal communicates with said communication interface, and said communication interface means transmits to said vending management center the purchase request information obtained through the communication with said portable communication terminal.

* * * * *